Figure 1:
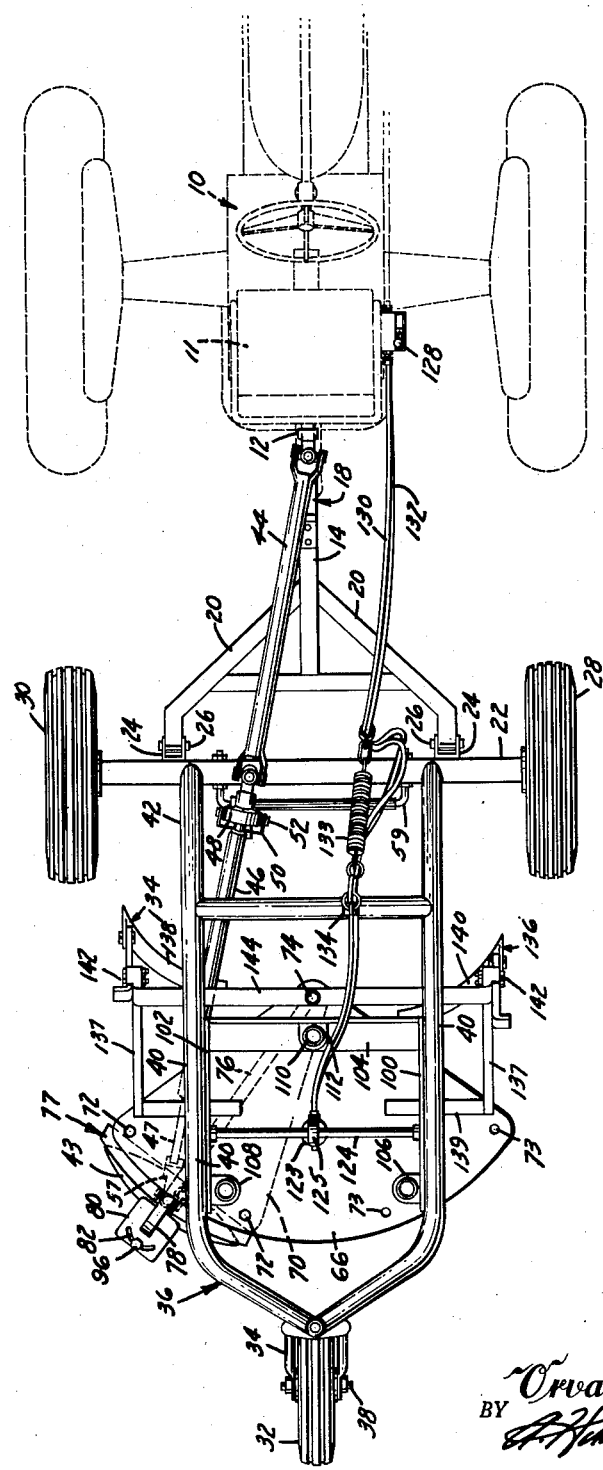

April 15, 1958     O. A. KEYES     2,830,517
WHEEL MOUNTED TERRACER
Filed Sept. 17, 1953     2 Sheets-Sheet 1

INVENTOR.
BY Orval A. Keyes

April 15, 1958 O. A. KEYES 2,830,517
WHEEL MOUNTED TERRACER
Filed Sept. 17, 1953 2 Sheets-Sheet 2
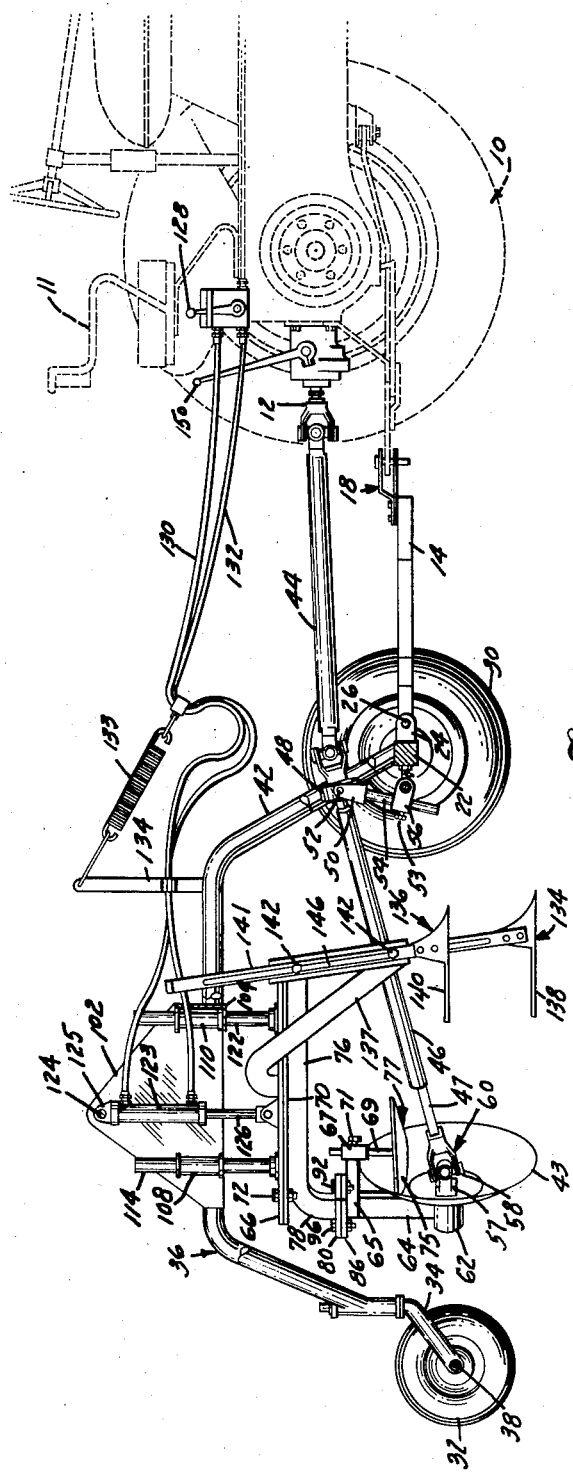
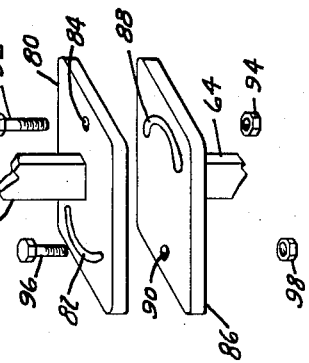
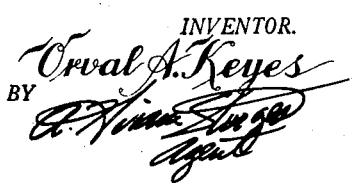
INVENTOR.
Orval A. Keyes United States Patent Office 2,830,517
Patented Apr. 15, 1958

2,830,517
WHEEL MOUNTED TERRACER
Orval A. Keyes, Springfield, Nebr.
Application September 17, 1953, Serial No. 380,651
1 Claim. (Cl. 97—37)

This invention relates to the building of terraces in soil conservation work on farms and in various types of contracting, more particularly it is an object of this invention to provide a wheel mounted terracer having a power driven disc.

Heretofore, excavating machines have been made with power driven discs but always with rotating blades disposed in front of the discs for digging the ground. These blades require too much power and result in a very unsatisfactory machine for terracing work.

Other prior art machines have discs which are driven from wheels supporting the disc frame, such construction causing the disc to rotate too slow for terracing and also causing the ground driven wheels of the disc frame to skid. Most of these earlier constructions have failed to have the disc facing in a proper direction.

It is therefore an object of this invention to provide a terracer which eliminates these undesirable features of the prior art.

It is furthermore an object of the invention to provide a wheel mounting frame for disc terracer in which the frame is provided with means for raising and lowering the disc with respect to the mounting wheels along a vertical line and without the movement of the disc upwardly and downwardly in adjustment along an arc as has been the case in some prior art machines, the direct vertical adjustment being desirable for control of the angle at which the blade is presented to the ground, and so that the disc does not move upwardly and downwardly along an arc as heretofore whereby the disc would present itself at a different angle to the ground at each different position of depth.

Still another object of the invention is to provide means for automatically raising and lowering the disc with respect to its frame.

Still another object is to provide adjustment for changing the angle with respect to the points of the compass, at which the disc approaches the ground and setting it at a desired position.

Yet a further object is to provide a wheel mounted terracer having a power driven disc which also has ground loosening members disposed in front of the disc, these members being used alternately according to the position of the disc on one side or other of the center line.

Still another object of the invention is to provide a terracer as described in which the disc is vertically adjustable and in which the means mounting the ground loosening members moves upwardly and downwardly in unison with the means controlling the disc.

Still another object of the invention is to provide a terracer as described in which the disc can be placed either on one side of the center line or the other or placed in between as desired.

Other and further objects and advantages of the present invention will be apparent from the following detailed description, drawings and claim, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claim.

Figure 1 is a top plan view of the terracer.
Figure 2 is a side elevation.
Figure 3 is a detail of the swivel connection of the disc.

The terracer of this invention is pulled by a tractor or any other desired means shown in dotted line and indicated broadly by the numeral 10. This vehicle must have a power take-off such as is shown at 12 and a means such as a pin and double bracket 18 for pivotally connecting to a tongue 14. Said tongue 14 branches into a Y bar 20. The two branches of the Y bar are mounted for up and down pivoting to the axle bar 22 by means of a bracket and pin connection shown at 24 and 26. The terracer of the present invention has three wheels, two forward wheels 28 and 30 are connected by the axle bar 22 and a rear wheel 32. A Y bar 34 connects to the center pin 38 of the rear wheel 32. A frame 36 has horizontal arms and downwardly extending portions 42 which have rigid connection with the axle 22.

The terracing wheel or disc 43 may be of concave shape. It is power driven through a series of connections, later to be described, from the power take off 12. The driven rod 44 connects to the rod 46 through a bearing 48. The bearing 48 is carried by the bracket and pivoted thereto for pivotal movement by means of the pins 52. The bracket is carried by a rod 54 which is journaled for sliding movement through a bracket 56. The bracket 56 is pivoted on and slidable along a rod 56 which extends parallel to the axle rod 22 and has substantially right angularly bent ends for rigid attachment to it.

One of the objectives of this mechanism is to keep the segments 44 and 46 of the driving rod as nearly in the same straight line as possible during all of the various movements and adjustments of parts of the disc 43, some of these which are already evident.

The rod 46 has a telescoping rod 47 which is pivoted to a knuckle 57 at the center of the disc 42 through the bracket 58 by conventional means such as are shown at 60. The knuckle carries a stud on the rearward side of the disc and this stud is journaled in a bearing 62. A bracket arm 64 carries this bearing and the whole disc is supported by a plate 66. This disc is horizontally placed and is of arcuate or fan shape formation. A movable plate 70 is bolted as at 72 to the plate 66. A bolt connection 74 operates as a pivot. The plate 70 can be moved radially about the center pivot 74 and bolted in any number of desired positions at openings 73 provided in the plate 66. This arcuate adjustment controls the position of the disc 43, as for example it may be positioned on one side or the other of the terracer, or any desired position therebetween.

The direction of the earth cut and thrown is further controlled by the angular position of the disc with respect to a vertical plane disposed in parallelism with the axle bar 22. This adjustable control is achieved by the following devices:

A supporting arm 73 which forms an integral part of the plate 70 has a downwardly curved portion 78. This arm terminates in an integral horizontal plate 80 having an arcuate slot 82 and an eye opening 84. The upwardly extending arm 64 terminates in a corresponding plate 86 which abutts the plate 80, and is provided with a slot 88 and eye opening 90.

It will now be seen that the arms 64 and 78 have limited relative rotating adjustment. A bolt 92 engages eye opening 84 and slot 88. Correspondingly a bolt 96 engages the slot 82 and the eye opening 90. A selected position of rigidity is secured by applying and tightening bolts 94 and 98.

The disc 43 is set into the ground and held there at a predetermined depth by hydraulic means, its vertical height or position being controllable. It will be seen that its movement upwardly and downwardly is in a true vertical line and not in an arc.

A pair of plates 100 and 102 are rigidly secured one each to the arms 40 of the frame. An angle member 104 has rigid attachment to each of the plates 100 and 102 and forms a stationary rigid frame, rigid and immovable with respect to the framework 36, 40 and 42.

The sleeves 106 and 108 also have rigid attachment to the vertically disposed plates 100 and 102 respectively.

A sleeve 110 is rigidly attached by means of the bracket 112 to the angle iron 104. Three upright rods 114, 116 and 122 rise rigidly from the plate or table 66 and slide through the sleeves 106, 108 and 110 respectively.

A rod 124 is attached at both ends to and forms part of the framework 40. The upper and outer sleeve 123 of a hydraulic ram is attached to the rod 124 by means of the bracket 125. The piston rod 126 is rigidly attached to the table or plate portion 66. The control 128 of the inlet lines 130 and 132 are within easy reach of the operator's seat 11 on the tractor.

A bracket 134 constitutes a guide for the hydraulic inlets 130 and 132 and also carries a spring 133 for controlling the slack.

It will thus be seen that the table member moves upwardly and downwardly as the pressure within the hydraulic ram is changed to opposite sides of the piston carried within it (not shown).

The earth digging sheeps feet 134 and 136 are disposed on either side of the terracer and have curved blades. They are slidably adjustable by means of screw sets 142 sliding in grooves 146 carried on telescoping members 141 and 143. The member 143 is carried for rigid attachment to said table and is braced thereto by means of the braces 137 rising and curving over to a portion 139 attached rigidly to the upper surface of the table 66, to one of two positions, either up out of the ground or down on a level with the disc 43. The sliding members 146 carrying the sheeps feet 134 and 136 and cutting blades 138 and 140 are both carried by the bracket 144 which is itself bolted to the table 66 by means of the bolt 74.

It is thus seen that the cutting blades 138 and 140 are raised and lowered as the disc is raised and lowered since they both have rigid connection with the table 66 which is raised and lowered by means of the hydraulic ram. These earth cutting devices may or may not be used.

The power for rotating the rod 44 is turned on and off by means of the handle 150, or any other conventional means.

In operation, the sheeps feet are set in the desired position either up, or down, and they are thereafter controlled by the table 66, and they go up or down as the disc 42 goes up or down.

In presently known devices, the cutting disc is rotatably mounted but not power driven and is dragged through the ground to rotate as it is dragged along.

One of the outstanding novel elements of the present invention lies in the fact that the disc 42 is power driven. The tractor can proceed at a greater rate of speed and in cooperation with the rotating disc the earth can be thrown a remarkably greater distance than heretofore possible.

The power is transmitted to the disc 42 through the rods 44 and 46 and the toggle joints at 58, 48, 150 and 12. Accommodation is therefore made between the revolving disc and its source of power for relative changes in the vertical and horizontal position of parts; i. e. the raising and lowering of the disc in operation and its adjustment from one side to the other. Accommodation is also amply made for shocks and uneven terrain encountered in operation and travel. Locking of the toggle or universal joint in a selected vertical position is accomplished as described, through the rod 54, the bracket 56 and the set screw 53.

The upright arm 64 carries a right angularly disposed arm 65 which terminates at its outer end in a sleeve 67. A rod 69 is adapted for sliding vertically in the sleeve 67 and can be secured, in any selected position by means of set screw 71. At the lower end of the rod 69 is secured a scraper 77. This scraper has a curved surface 75 which is complementary in shape to the concave surface of the disc 43. As will readily be seen, the vertical position of the scraper 77 can be changed as desired. In addition to a scraping function the element 77 also controls the direction and the distance in which the earth is thrown.

From the foregoing description it is thought to be obvious that a Wheel Mounted Terracer constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

A terracing machine comprising a rotatable upright disc having a concave forward side, means rotatably mounting said disc for rotation about an axis approximately horizontally disposed and inclinedly disposed with respect to a direction of draft whereby the lower end of said disc engages the ground, means comprising a motor for causing said disc to rotate in a direction downward at its forward edge at a speed sufficient for building terraces, means for deflecting dirt from the forward side of said disc to cause said dirt to be cast to a side of said disc, said deflecting means comprising a deflecting member disposed directly in front of said disc and having a portion closely spaced from the upwardly moving side of the front of said disc and having a rearward edge closely spaced from the upwardly moving side of the front of said disc and said rearward edge having a curvature generally complemental to adjacent parts of said disc for substantially preventing dirt thrown at terrace-building speed by said disc from flying up into the air from between said deflector portion and said disc, said deflecting member portion having an underside surface extending transversely of the axis of said disc and extending generally forwardly from said disc and of a substantial forward to rearward width for deflecting dirt and means for supporting said disc at a desired position with respect to the ground, said means rotatably mounting said disc comprising a wheel mounted frame, a table, means hydraulically raising and lowering said table with respect to said frame, a plate on the under surface of said table and attached thereto for arcuate adjustment about a pivot, said disc being mounted on said plate for arcuate movement therewith and for upward and downward movement with said table, earth cutting elements attached to said table and capable of adjustment up or down simultaneously with the earth moving disc by raising and lowering said table, and means for adjusting the angular relation of said disc with respect to the points of the compass, and means communicating with a source of power for rotating said disc.

(References on following page)

References Cited in the file of this patent

UNITED STATES PATENTS

| | | |
|---|---|---|
| 955,179 | Martin | Apr. 19, 1910 |
| 1,104,569 | Stephens | July 21, 1914 |
| 1,892,485 | Dufour | Dec. 27, 1932 |
| 2,310,735 | Greer | Feb. 9, 1943 |
| 2,453,197 | Clay | Nov. 9, 1948 |
| 2,510,779 | Hancock | June 6, 1950 |
| 2,561,032 | Onfrey | July 17, 1951 |
| 2,572,298 | Alvarez | Oct. 23, 1951 |
| 2,601,380 | Flory | June 24, 1952 |
| 2,619,747 | Wiens | Dec. 2, 1952 |
| 2,788,726 | Keyes | Apr. 16, 1957 |